United States Patent Office 3,123,611
Patented Mar. 3, 1964

3,123,611
PHENANTHRENE CARBOXAMIDES AND
DERIVATIVES THEREOF
Moses Wolf Goldberg and Lester Mischa Jampolsky, both of Upper Montclair, N.J., assignors to Hoffmann-La Roche Inc., Nutley, N.J., a corporation of New Jersey
No Drawing. Filed Dec. 18, 1961, Ser. No. 160,289
11 Claims. (Cl. 260—294.7)

The present invention relates to polyhydrophenanthrene derivatives having utility in the pharmaceutical field and to methods for their preparation. More particularly, the instant invention relates to 2-(carbamyl or substituted carbamyl) - 7 - methoxy - 1,2,3,4,4a,9,10,10a - octahydrophenanthrenes having the formula

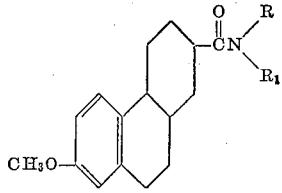

wherein R and $R_1$ can be the same or different, and represent hydrogen; lower alkyl, e.g., methyl, ethyl, isopropyl, etc.; the group —$CH_2CH_2Y$, wherein Y represents hydroxy or diloweralkylamino, e.g. dimethylamino, diethylamino, etc.; or R and $R_1$ taken together form with the nitrogen atom a saturated 5 to 8 member heterocyclic ring having the nitrogen atom as the only hetero atom present, e.g., piperidino.

The invention also relates to intermediates and methods for the preparation of the above compounds.

The compounds of the invention have asymmetric carbon atoms, and the various stereoisomers are included within the scope of the invention.

The novel compounds of the invention exhibit at least one of the following activities: serum cholesterol lowering activity, antigonadotropic activity, and estrogenic activity; and are useful as one or more of the following: hypocholesterolemic agent, antigonadotropin, and estrogen.

The compounds of the invention, i.e., the 2-(carbamyl or substituted carbamyl)-7-methoxy-1,2,3,4,4a,9,10,10a-octahydrophenanthrenes are prepared by treating a 7-methoxy - 1,2,3,4,4a,9,10,10a - octahydro - 2 - phenanthrenecarboxylic acid or an alkali metal salt thereof with oxalyl halide or an inorganic acid halide, preferably a chloride or bromide, for example, phosphorus trihalide, phosphorus pentahalide, phosphorus oxyhalide, or thionyl halide, e.g., $PBr_3$, $PCl_3$, $PCl_5$, $POCl_3$, $SOCl_2$, etc., to form the corresponding acid halide; and then reacting the acid halide with ammonia or a primary or secondary amine. The reaction scheme is presented briefly below:

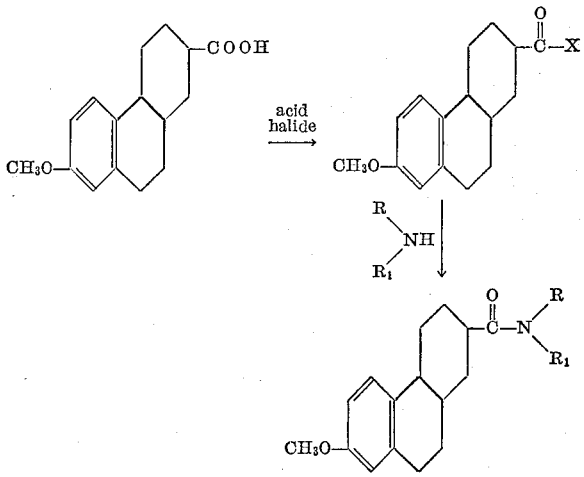

In the above reaction scheme X represents halogen; R and $R_1$ have been defined previously.

The first step of the reaction, i.e., reaction of a 7-methoxy - 1,2,3,4,4a,9,10,10a - octahydro - 2 phenanthrenecarboxylic acid with an inorganic acid halide or oxalyl halide is preferably carried out in the presence of an inert solvent, e.g., benzene, alkyl benzenes, ether, chloroform, petroleum ether, etc., preferably at a temperature ranging from room temperature to the reflux temperature of the mixture. The octahydrophenanthrene acid halide can be isolated in the usual way if desired, but isolation of the octahydrophenanthrene acid halide in pure crystalline form is not necessary. The preferred procedure is to use oxalyl chloride or thionyl chloride and concentrate the reaction mixture to dryness under vacuum, and then add it to a solution of an amine in an organic solvent. The organic solvent is removed from the reaction mixture to obtain the product.

When the starting material for the above reaction is the isomer 7-methoxy-1,2,3,4,4a,9,10,10a-octahydro-2-phenanthrenecarboxylic acid (rings B/C trans), a 2 - carbamyl or substituted carbamyl) - 7 - methoxy-1,2,3,4,4a,9,10,10a-octahydrophenanthrene (rings B/C trans) is obtained. When the starting material is the higher melting isomer (isomer 1) of 7-methoxy-1,2,3,4,4a,9,10,10a - octahydro-2-phenanthrenecarboxylic acid (rings B/C cis), the product is the stereoisometrically corresponding isomer of 2-(carbamyl or substituted carbamyl) - 7 - methoxy - 1,2,3,4,4a,9,10,10a - octahydrophenanthrene (rings B/C cis). When the starting material is the lower melting isomer (isomer 2) of 7-methoxy-1,2,3,4,4a,9,10,10a - octahydro-2-phenanthrenecarboxylic acid (rings B/C cis), the stereoisometrically corresponding isomer of 2-(carbamyl or substituted carbamyl)-7 - methoxy - 1,2,3,4,4a,9,10,10a - octahydrophenanthrene (rings B/C cis) is obtained. Normally, the above stereoisomers are employed as racemates. However, if it is desired to obtain a particular optical isomer thereof, i.e., the dextro- or levo-rotatory form, the corresponding optical isomer of the starting material is used. For example, if d-7-methoxy-1,2,3,4,4a,9,10,10a-octahydro-2-phenanthrenecarboxylic acid (rings B/C trans) is employed as the starting material, the product will be d-2-(carbamyl or substituted carbamyl)-7-methoxy-1,2,3,4,4a,9,10,10a-octahydrophenanthrene (rings B/C trans).

It is to be understood that neither the starting materials, i.e., the various optically active and racemic stereoisomers of 7-methoxy-1,2,3,4,4a,9,10,10a-octahydro-2-phenanthrenecarboxylic acid nor the methods for their preparation which are given hereinafter for purposes of completeness, comprise part of the invention.

The temperatures given herein are all expressed in centigrade.

EXAMPLE 1

*Preparation of the Higher Melting Isomer of 2-Carbamyl-7-Methoxy-1,2,3,4,4a,9,10,10a - Octahydrophenanthrene (Rings B/C Cis)*

To a solution of 50 g. of the higher melting isomer of 7-methoxy - 1,2,3,4,4a,9,10,10a - octahydro - 2 - phenanthrenecarboxylic acid (rings B/C cis) in 2500 ml. of benzene is added 170 ml. of thionyl chloride, and the solution refluxed for 2 hours. The benzene solution is evaporated to dryness, the residue taken up in benzene and the solution re-evaporated to remove excess thionyl chloride. The acid chloride intermediate is used directly without further purification.

A solution of 6.4 g. of the acid chloride in 50 ml. of benzene is slowly added at 0° C., with stirring, to 500 ml. of ether containing 3.9 g. of ammonia. The mixture is stirred at room temperature for 18 hours, poured into 1 liter of water and the layers separated. The ether layer is washed successively with 1 N NaOH solution, 2 N HCl solution, water and with brine. After drying and evaporation of the organic solvent, crystallization from acetonitrile gives 3.9 g. of the higher melting isomer of 2-carbamyl - 7 - methoxy - 1,2,3,4,4a,9,10,10a - octahydrophenanthrene (rings B/C cis), M.P. 204.5–205.5°.

EXAMPLE 2

*Preparation of the Isomer of 2-(N-Methylcarbamyl)-7-Methoxy - 1,2,3,4,4a,9,10,10a - Octahydrophenanthrene (Rings B/C Cis) Corresponding Stereoisometrically to the Higher Melting Isomer of 7-Methoxy-1,2,3,4,4a,9,10,10a-Octahydrophenanthrene (Rings B/C Cis)-2-Carboxylic Acid*

A solution of 9 g. of the acid chloride prepared in Example 1 in 100 ml. of benzene is slowly added at 0° C. to 500 ml. of ether containing 9.6 g. of methylamine. The mixture is stirred for 18 hours. One liter of water is added thereto and the layers separated. The ether layer is washed with water and with brine. After drying and evaporation of the organic solvent, crystallization from benzene gives 1.6 g. of 2-(N-methylcarbamyl)-7-methoxy-1,2,3,4,4a,9,10,10a - octahydrophenanthrene (rings B/C cis), M.P. 195–195.5°.

EXAMPLE 3

*Preparation of the Isomer of 2-(N,N-Dimethyl)-Carbamyl-7-Methoxy - 1,2,3,4,4a,9,10,10a - Octahydrophenanthrene (Rings B/C Cis) Corresponding Stereoisometrically to the Higher Melting Isomer of 7-Methoxy-1,2,3,4,4a,9,10,10a-Octahydrophenanthrene (Rings B/C Cis)-2-Carboxylic Acid*

A solution of 25.6 g. of the acid chloride prepared in Example 1 in 200 ml. of benzene is slowly added, at 0° C., to 1000 ml. of ether containing 91.2 g. of dimethylamine. The mixture is stirred at room temperature for 18 hours. Two liters of water are added and the layers separated. The ether layer is washed successively with 1 N NaOH solution, 2 N HCl solution, water and with brine. After drying and evaporation of the organic solvent, crystallization from acetonitrile gives 14.6 g. of 2-(N,N-dimethyl)-carbamyl-7-methoxy-1,2,3,4,4a,9,10,10a - octahydrophenanthrene (rings B/C cis), M.P. 130–131°.

EXAMPLE 4

*Preparation of the Isomer of 2-(N-Propylcarbamyl)-7-Methoxy - 1,2,3,4,4a,9,10,10a - Octahydrophenanthrene (Rings B/C Cis) Corresponding Stereoisometrically to the Higher Melting Isomer of 7-Methoxy-1,2,3,4,4a,9,10,10a-Octahydrophenanthrene (Rings B/C Cis)-2-Carboxylic Acid*

A solution of 6.4 g. of the acid chloride prepared in Example 1 in 50 ml. of benzene is slowly added at 0° C. to 500 ml. of ether containing 13.5 g. of n-propyl amine with stirring. The mixture is stirred at room temperature for 18 hours. This solution is poured into 1 liter of water and the layers separated. The ether layer is washed successively with 1 N NaOH solution, 2 N HCl solution, water and with brine. After drying and evaporation of the organic solvent, crystallization from acetonitrile gives 2.7 g. of 2-(N-propylcarbamyl)-7-methoxy-1,2,3,4,4a,9,10,10a-octahydrophenanthrene (rings B/C cis), M.P. 127–128.5°.

EXAMPLE 5

*Preparation of the Isomer of 2-(N-Diethylaminoethylcarbamyl)-7-Methoxy - 1,2,3,4,4a,9,10,10a - Octahydro-Phenanthrene (Rings B/C Cis) Corresponding stereoisometrically to the Higher Melting Isomer of 7-Methoxy-1,2,3,4,4a,9,10,10a-Octahydrophenanthrene (Rings B/C Cis)-2-Carboxylic Acid*

A solution of 10 g. of the acid chloride prepared in Example 1 in 100 ml. of benzene is slowly added at 0° C. to 500 ml. of ether containing 8.5 g. of β-diethylaminoethylamine. The mixture is stirred at room temperature for 18 hours. One liter of water is added and the layers separated. The ether layer is washed successively with 1 N NaOH solution, water and with brine. After drying and evaporation of the organic solvent, crystallization from acetone gives 6.2 g. of 2-(N-diethylaminoethylcarbamyl)-7-methoxy-1,2,3,4,4a,9,10,10a - octahydrophenanthrene (rings B/C cis), M.P. 101–103°.

EXAMPLE 6

*Preparation of Hydrochloride Salt of 2-(N-diethylaminoethylcarbamyl)-7-Methoxy - 1,2,3,4,4a,9,10,10a-Octahydrophenanthrene (Rings B/C Cis) (M.P. 101–103°)*

To 4.7 g. of the product of Example 5 in 100 ml. of methanol is added 30 ml. of 4.7 N methanolic HCl. Evaporation of the methanol and crystallization from acetone gives 3.2 g. of the hydrochloride salt of the product of Example 5, M.P. 148–150°.

EXAMPLE 7

*Preparation of the Lower Melting Isomer of 2-Carbamyl-7 - Methoxy - 1,2,3,4,4a,9,10,10a - Octahydrophenanthrene (Rings B/C Cis)*

To a solution of 31 g. of the lower melting isomer of 7 - methoxy - 1,2,3,4,4a,9,10,10a - octahydro - 2 - phenanthrenecarboxylic acid (rings B/C cis) in 1700 ml. of benzene is added 100 ml. of thionyl chloride, and the solution refluxed for two hours. The benzene solution is evaporated to dryness, the residue taken up in benzene and the solution evaporated to remove excess thionyl chloride. The acid chloride intermediate is used directly without further purification.

A solution of 8 g. of the acid chloride in 75 ml. of benzene is slowly added at 0° C. to 750 ml. of ether containing 4.9 g. of ammonia. The mixture is stirred at room temperature for 18 hours. One liter of water is added and the layers separated. The ether layer is washed with water and with brine. After drying and evaporation of the organic solvent, crystallization from acetonitrile gives 5.5 g. of the lower melting isomer of 2 - carbamyl-7-methoxy - 1,2,3,4,4a,9,10,10 - octahydrophenanthrene (ringsB/C cis), M.P. 170–171.5°.

EXAMPLE 8

*Preparation of 2-(N,N-di-β-Hydroxyethyl)Carbamyl-7-1, 2,3,4,4a,9,10,10a-Octahydrophenanthrene (Rings B/C Trans)*

To a solution of 37 g. of 7-methoxy-1,2,3,4,4a,9,10,10a-octahydro - 2 - phenanthrenecarboxylic acid (rings B/C trans) in 2 liters of benzene is added 140 ml. of thionyl chloride, and the solution refluxed for 2 hours. The benzene solution is evaporated, the residue taken up in benzene and the solution evaporated to dryness to remove excess thionyl chloride. The acid chloride intermediate is used directly without further purification.

A solution of 9.9 g. of the acid chloride in 100 ml. of benzene is slowly added to 500 ml. of ether containing 11.3 g. of diethanolamine at 0° C. The mixture is stirred at room temperature for 18 hours. One liter of water is added and the layers separated. The ether layer is washed with water and with brine. After drying and evaporation of the organic solvent, crystallization from benzene gives 4.5 g. of 2-(N,N-di-β-hydroxyethyl)carbamyl-7-methoxy-1,2,3,4,4a,9,10,10a - octahydrophenanthrene (rings B/C trans), M.P. 111.5–113°.

EXAMPLE 9

*Preparation of 2-(N,N-Diethyl)Carbamyl-7-Methoxy-1, 2,3,4,4a,9,10,10a-Octahydrophenanthrene (Rings B/C Trans)*

A solution of 9.9 g. of the acid chloride prepared in Example 8 in 100 ml. of benzene is slowly added at 0° C. to 500 ml. of ether containing 7.8 g. of diethylamine. The mixture is stirred at room temperature for 18 hours. One liter of water is added and the layers separated. The ether layer is washed with 1 N NaOH solution, with water and with brine. After drying and evaporation of the solvent, crystallization from acetone gives 5.9 g. of 2-(N,N-diethyl)carbamyl - 7 - methoxy-1,2,3,4,4a,9,10,10a-octahydrophenanthrene (rings B/C trans), M.P. 81–82°.

EXAMPLE 10

*Preparation of 7-Methoxy-1,2,3,4,4a,9,10,10a-Octahydro-2-Phenanthrenecarboxylic Acid Piperidide (Rings B/C Trans)*

A solution of 9.9 g. of the acid chloride prepared in Example 8 in 100 ml. of benzene is slowly added at 0° C. to 500 ml. of ether containing 9.1 g. of piperidine. The mixture is stirred at room temperature for 18 hours. One liter of water is added and the layers separated. The ether layer is washed with 1 N NaOH solution, water and with brine. After drying and evaporation of the solvent, crystallization from acetone gives 5.7 g. of 7-methoxy-1,2,3,4,4a,9,10,10a-octahydro-2-phenanthrene - carboxylic acid piperidide (rings B/C trans), M.P. 100–101°.

EXAMPLE 11

*Preparation of 2-(β-Diethylaminoethylcarbamyl)-7-Methoxy - 1,2,3,4,4a,9,10,10a - Octahydrophenanthrene (Rings B/C Trans)*

A solution of 10 g. of the acid chloride prepared in Example 8 in 100 ml. of benzene is slowly added at 0° C. to 500 ml. of ether containing 8.5 g. of β-diethylaminoethylamine. The mixture is stirred at room temperature for 18 hours. One liter of water is added and the layers separated. The ether layer is washed with 1 N NaOH solution, water and with brine. After drying and evaporation of the solvent, crystallization from acetone gives 8.6 g. of 2-(N-β-diethylaminoethylcarbamyl)-7-methoxy-1,2,3,4,4a,9,10,10a - octahydrophenanthrene (rings B/C trans), M.P. 137–138°.

EXAMPLE 12

*Preparation of 2-Carbamyl-7-Methoxy-1,2,3,4,4a,9,10,10a-Octahydrophenanthrene (Rings B/C Trans)*

A solution of 4.75 g. of 7-methoxy-1,2,3,4,4a,9,10,10a-octahydro-2-phenanthrenecarboxylic acid chloride (rings B/C trans) prepared according to the process of Example 8 in 150 ml. of benzene is slowly added at 0° C. to 500 ml. of ether containing 4.0 g. of ammonia. The mixture is stirred at room temperature for 18 hours. One liter of water is added and the layers separated. The ether layer is washed with 1 N NaOH solution, 2 N HCl solution, with water and with brine. After drying and evaporation of the solvent, crystallization from ethanol gives 3 g. of 2-carbamyl-7-methoxy-1,2,3,4,4a,9,10,10a-octahydrophenanthrene (rings B/C trans), M.P. 196–197.5° C.

EXAMPLE 13

*Preparation of 2-(N-Methylcarbamyl)-7-Methoxy-1,2,3,4,4a,9,10,10a-Octahydrophenanthrene (Rings B/C Trans)*

A solution of 4.75 g. of 7-methoxy-1,2,3,4,4a,9,10,10a-octahydro-2-phenanthrenecarboxylic acid chloride (rings B/C trans) prepared according to the process of Example 8 in 150 ml. of benzene is slowly added at 0° C. to 250 ml. of ether containing 5.08 g. of methylamine. The mixture is stirred at room temperature for 18 hours. One liter of water is added. The undissolved material which forms at this point is separated by filtration. The ether layer is separated, washed with 1 N NaOH solution, 2 N HCl solution and with brine. After drying and evaporation of the ether the residue is combined with the undissolved material, which had been previously separated, and the combined material crystallized from benzene giving 3 g. of 2-(N-methylcarbamyl)-7-methoxy-1,2,3,4,4a, 9,10,10a-octahydrophenanthrene (rings B/C trans), M.P. 187–188° C.

While the above examples are given for the preparation of the racemic isomers of the invention (the acid starting materials being employed as racemic mixtures), it is to be understood that the optical antipodes of the compounds of the invention can be prepared by carrying out the process of the invention with an optically active isomer of the acid starting materials.

PREPARATION OF THE STARTING MATERIALS

*Preparation of dl-7-Methoxy-1,2,3,4,4a,9,10,10a-Octahydro-2-Phenanthrenecarboxylic Acid (Rings B/C Trans)*

A. A mixture of 35.74 g. of 2-acetyl-7-methoxy-1,2,3,4,9,10-hexahydrophenanthrene (see U.S. 2,894,958 to Goldberg et al.), 17 ml. of ethylene glycol, and 0.25 g. of p-toluene-sulfonic acid monohydrate in 240 ml. of benzene is refluxed for 5 hours with a water separator. The solution is washed twice with 50 ml. of sodium carbonate and twice with 50 ml. of water. After being dried with sodium sulfate, the organic layer is stripped of solvent in vacuo; the residual viscous oil is the cyclic ethylene acetal of 2-acetyl-7-methoxy-1,2,3,4,9,10-hexahydrophenanthrene.

A solution of 30.1 g. of the cyclic ethylene acetal of 2-acetyl-7-methoxy-1,2,3,4,9,10-hexahydrophenanthrene in 300 ml. of anhydrous ether is added, with stirring, to a solution of 13.8 g. of potassium in 900 ml. of liquid ammonia at −40°. After the solution is stirred for 45 minutes, 23 g. of ammonium chloride is added, and the ammonia is permitted to boil off while stirring is continued.

The residue is treated with ice, water and an additional 200 ml. of ether. The ether layer is separated and washed with water. The water layers are washed with 100 ml. of ether. The ether layers are combined, dried with sodium sulfate, and the solvent is removed in vacuo.

To the residue, dissolved in 300 ml. of methanol, are added 7.5 g. of oxalic acid and 75 ml. of water, and the mixture is refluxed for one hour. The methanol is removed in vacuo, the residue is diluted with 100 ml. of water and extracted with 300 ml. of ether. The organic layer is separated and washed with water. The water layers are washed with 100 ml. of ether. The combined organic layers are dried with sodium sulfate, and the solvent is removed in vacuo. The residue, dl-2-acetyl-7-methoxy - 1,2,3,4,4a,9,10,10a - octahydrophenanthrene (rings B/C trans) is crystallized from a small volume of ethanol, and then recrystallized from petroleum ether, M.P. 83–85°.

A solution of sodium hypobromite is prepared from 109 g. (2.73 moles) of sodium hydroxide and 169 g. (1.06 moles) of bromine in 1500 ml. of water. To this cooled solution (ice-salt freezing mixture) is added with stirring 78 g. (0.302 moles) (the additional quantity is prepared as above) of dl-2-acetyl-7-methoxy-1,2,3,4,4a, 9,10,10a-octahydrophenanthrene (rings B/C trans) dissolved in 1500 ml. of dioxane, at such a rate that the temperature does not rise above 10°. When the addition is complete, the cooling bath is removed and the resulting solution is stirred for one hour at room temperature. It is then concentrated in vacuo to about one quarter of its original volume and then diluted with 3 liters of water. This aqueous solution is extracted twice with ether, and is then cooled to 0° and acidified to congo red with about 600 ml. of 3 N hydrochloric acid. The precipitated product is filtered, washed with water and dried to give 78.2 g. of crude solid. The product is dissolved in 1 liter of hot chroroform, filtered through celite, and the solution concentrated to about 250 ml. with slow addition of acetone. The substance crystallizes from the boiling solution, giving 65.8 g. of dl-7-methoxy-1,2,3,4,4a,9,10,10a-octahydro-2-phenanthrenecarboxylic acid (rings B/C trans), M.P. about 241–243° C. Further concentration of the mother liquors affords 6.47 g. of material melting at 235–240°. Total yield 74.27 g. (92%).

B. To 3.8 g. of 2-acetyl-7-methoxy-1,2,3,4,9,10-hexahydrophenanthrene in 150 ml. of purified dioxane is added a solution of 2.84 ml. of bromine in 150 ml. of 1 N aqueous sodium hydroxide. The mixture is allowed to stand three hours at room temperature, and is then concentrated in vacuo to a small volume, then diluted with 60 ml. of water and is then extracted twice with 500 ml. of ether. The water layer is acidified with 5 N sulfuric acid, and the precipitate is filtered off, washed with water and dried. Yield: 3.17 g. of 7-methoxy-1,2,3,4,9,10-hexahydro-2-phenanthrenecarboxylic acid. After two recrystallizations from acetone, the melting point is about 184–188° C.

In a cooled (Dry Ice-acetone) 1 liter flask fitted with an efficient stirrer and two drying towers (potassium hydroxide) is added 400 ml. of liquid ammonia, followed by 5.0 g. of potassium. After stirring for five minutes, a solution of 2.58 g. of 7-methoxy-1,2,3,4,9,10-hexahydro-2-phenanthrenecarboxylic acid in 125 ml. of dioxane is added over five minutes. The mixture is stirred for 25 minutes and the blue color is then discharged by the addition of 10 g. of ammonium chloride. The ammonia is allowed to evaporate and the remaining solvent is removed under vacuum. The residue is treated with 100 ml. of 2 N hydrochloric acid and this mixture is extracted three times with ether-methylene chloride (2.5:1). The organic layers are washed twice with water and are then extracted twice with a total of 100 ml. of N potassium hydroxide solution. The combined basic layers are cooled and acidified to congo red with 3 N hydrochloric acid. The resulting precipitate is filtered, washed with water and dried to give 2.44 g. of colorless solid, M.P. 208–222°.

The above colorless solid is dissolved in 50 ml. of hot ethanol and to this solution is added 1.1 ml. of morpholine in 5.6 of ethanol. The resulting mixture is concentrated to 40 ml. and is then cooled to room temperature and seeded with a small quantity of the morpholine salt of the acid prepared by method A. The mixture is allowed to stand overnight at room temperature, and is then cooled and filtered to give 1.41 g. of crude morpholine salt of dl-7-methoxy-1,2,3,4,4a,9,10,10a-octahydro-2-phenanthrenecarboxylic acid (rings B/C trans), M.P. 136.5–144°.

A solution of the above morpholine salt in 60 ml. of methylene chloride is washed twice with 50 ml. of 2 N hydrochloric acid and once with water. The organic layers (washed once with water) are combined, dried (anhydrous $Na_2SO_4$) and evaporated to give 1.09 g. of crude product, M.P. 233–239°. Crystallization from methanol gives 0.822 g. (31.6%) of the trans acid as a colorless solid, M.P. about 239–242.5°. One further crystallization from methanol gives 0.680 g. of product, M.P. 240–243.5°, undepressed upon admixture with a specimen of product prepared as in A above.

*Resolution of dl-7-Methoxy-1,2,3,4,4a,9,10,10a-Octahydro-2-Phenanthrenecarboxylic Acid (Rings B/C Trans)*

30 g. of dl-7-methoxy-1,2,3,4,4a,9,10,10a-octahydro-2-phenanthrenecarboxylic acid (rings B/C trans), in 175 ml. of benzene is treated with 100 ml. of thionyl chloride and the resulting mixture is heated under reflux for 1 hour. The mixture is then cooled and concentrated to dryness under vacuum. The residue is evaporated twice in the presence of benzene to remove the last traces of thionyl chloride. The resulting crude acid chloride in 75 ml. of benzene is added rapidly to a solution of 18.5 g. of l-menthol in 50 ml. of dry pyridine, and the resulting solution allowed to stand overnight at room temperature in an atmosphere of nitrogen. The solution is then diluted with 700 ml. of water and is extracted three times with methylene chloride-ether (2.5:1). The organic layers are washed three times with 2 N hydrochloric acid, twice with N sodium hydroxide solution and once with water. The combined organic layers are dried (anhydrous $Na_2SO_4$) and evaporated to dryness to give a yellow solid.

(*a*) l-MENTHYL ESTER OF d-7-METHOXY-1,2,3,4,4a,9,10,10a - OCTAHYDRO - 2 - PHENANTHRENECARBOXYLIC ACID (RINGS B/C TRANS)

Fractional crystallization of the above crude product from ethanol gives 7.62 g. (33%) of the l-menthyl ester of the dextro acid as a colorless solid, M.P. 121–122.5°, $[\alpha]_D^{25}$ +24.9°±2° (c. 1.06 in dioxane). One further crystallization from ethanol gives a pure sample, M.P. 122–123°, $[\alpha]_D^{25}$ +25.4°±2° (c. 1.08 in dioxane).

(*b*) d - 7 - METHOXY - 1,2,3,4,4a,9,10,10a-OCTAHYDRO-2-PHENANTHRENECARBOXYLIC ACID (RINGS B/C TRANS)

A solution of 6.65 g. of the above ester in 83.5 ml. of 5% ethanolic potassium hydroxide solution is heated under reflux for two hours in an atmosphere of nitrogen. The resulting solution is then cooled and evaporated to dryness. The residue is diluted with 700 ml. of water and washed twice with ether. The aqueous layer is then acidified to congo red with 3 N hydrochloric acid and the resulting precipitate is filtered, dried, and crystallized from methanol (charcoal) to give 3.25 g. (75%) of the dextro acid as a colorless solid, M.P. 248–249.5°, $[\alpha]_D^{26}$ +94.8°±2° (c. 1.06 in chloroform). One further crystallization from chloroform-acetone gives a pure sample, M.P. 246–248°, $[\alpha]_D^{26}$ +94.0°±2° (c.1.03 in chloroform).

(*c*) l-MENTHYL ESTER OF l-7-METHOXY-1,2,3,4,4a,9,10,10a - OCTAHYDRO - 2 - PHENANTHRENECARBOXYLIC ACID (RINGS B/C TRANS)

The filtrates from the crystallization of the l-menthyl ester of the dextro acid (experiment "*a*") are concentrated. Fractional crystallization of the solids from acetonitrile gives 5.65 g. (24.5%) of the l-menthyl ester of the levo acid as a colorless solid, M.P. 106.5–108°, $[\alpha]_D^{25}$ $$-93.2°\pm2°$$

(c. 1.11 in dioxane). Two further crystallizations from acetonitrile gives a pure sample, M.P. 108–109.5°, $[\alpha]_D^{25}$ $$-95.6°\pm2°$$

(c. 1.00 in dioxane)

(*d*) l - 7 - METHOXY - 1,2,3,4,4a,9,10,10a - OCTAHYDRO-2-PHENANTHRENECARBOXYLIC ACID (RINGS B/C TRANS)

A solution of 5.108 g. of the above ester (part "*c*") in 64.0 ml. of 5% ethanolic potassium hydroxide solution is heated under reflux for 2.5 hours in an atmosphere of nitrogen. The solution is then cooled and evaporated to dryness. The residue is diluted with water and is washed twice with ether. The aqueous layer is then acidified to congo red with 3 N hydrochloric acid. The resulting precipitate is crystallized once from methanol (charcoal) and once from chloroform to give 1.832 g. of the levo acid as a colorless solid, M.P. 247.5–249.5°, $[\alpha]_D^{26}$ $$-94.4°\pm2°$$

(c. 1.034 in chloroform). A further 0.429 g., M.P. 246.5–249.5°, $[\alpha]_D^{24}$ −93.1°±2° (c. 1.06 in chloroform) is recovered from the mother liquors. Total yield: 2.26 g. (67.7%). One further crystallization from chloroformacetone gives a pure sample, M.P. 247–248.5°, $[\alpha]_D^{25}$ $$-95.8°\pm2°$$

(c. 1.03 in chloroform).

*Preparation of dl-2-Acetyl-7-Methoxy-1,2,3,4,4a,9,10,10a-Octahydrophenanthrene (Rings B/C Cis, Isomers 1 and 2)*

A. A solution of 102.5 g. of 2-acetyl-7-methoxy-1,2,3,4,9,10-hexahydrophenanthrene in 3000 ml. of ethyl acetate is hydrogenated at room temperature and atmospheric pressure over 10.0 g. of 10% palladium on carbon. After the absorption of 1 mole of hydrogen, the rate of hydrogenation markedly decreases and the reaction is stopped. The mixture is filtered through celite and evaporated to dryness to give a colorless oil.

The oily residue is crystallized from petroleum ether to give 75.6 g. of dl-2-acetyl-7-methoxy-1,2,3,4,4a,9,10,10a-octahydrophenanthrene (rings B/C cis, isomer 2) of M.P. 84.5–87° C. Concentration of the mother liquors yields 21 g. of dl-2-acetyl-7-methoxy-1,2,3,4,4a,9,10,10a-octahydrophenanthrene (rings B/C cis, isomer 1) of M.P. 65–66° C.

B. *Epimerization of isomer 2 under acidic conditions.*— To a solution of 12.05 g. of isomer 2 in 350 ml. of glacial acetic acid is added 12.0 ml. of 30% hydrogen bromide in glacial acetic acid and the resulting mixture is allowed to stand overnight at room temperature. It is then poured into 2000 ml. of water and extracted with ether, washed twice with water, twice with 5% sodium bicarbonate solution, once with water and dried (anhydrous $Na_2SO_4$). Removal of the solvent gives an oil which is crystallized from ether-hexane to give 8.92 g. (74%) of crude isomer 1, M.P. 60–66°. One further crystallization from methanol gives 6.02 g. of product, M.P. 66–67°. Crystallization from ether-hexane gives a pure sample, M.P. 64.5–66°.

The semicarbazone of the product has a M.P. of 226–228° C.

C. *Epimerization of isomer 2 under basic conditions.*— To a solution of 500 mg. of isomer 2 in 15 ml. of anhydrous methanol is added 250 mg. of sodium methoxide and the resulting solution is heated under reflux for 2 hours. It is then concentrated under vacuum to about 5 ml. and this residue is diluted with 25 ml. of water. The product is isolated with methylene chloride-ether (2.5:1), washed with water, dried (anhydrous $Na_2SO_4$) and evaporated to give an oil which is crystallized from ether-hexane to yield 302 mg. (60%) of crude isomer 1, M.P. 60.5–65°.

*Preparation of dl-7-Methoxy-1,2,3,4,4a,9,10,10a-Octahydro-2-Phenanthrenecarboxylic Acid (Rings B/C Cis, Isomer 1)*

A solution of sodium hypobromite is prepared from 7.0 g. of sodium hydroxide and 3.5 ml. of bromine in 100 ml. of water. To this cooled solution (ice-salt freezing mixture) is added with stirring 5.0 g. of dl-2-acetyl-7-methoxy - 1,2,3,4,4a,9,10,10a - octahydrophenanthrene (rings B/C cis, isomer 1), dissolved in 100 ml. of dioxane, at such a rate (about 20 minutes) that the temperature does not rise above 10°. When the addition is complete, the cooling bath is removed and the resulting solution is stirred for 1.5 hours at room temperature. It is then concentrated in vacuo to about one third its original volume and diluted with 500 ml. of water. This solution is extracted twice with ether and then cooled and acidified to Congo red with 3 N hydrochloric acid. The resulting precipitate is filtered, washed with water and dried to give 4.98 g. of colorless solid, M.P. 218.5–222°. One crystallization from acetonitrile gives 4.25 g. (84%) of product, M.P. 222–223°.

*Resolution of dl - 7 - Methoxy-1,2,3,4,4a,9,10,10a - Octahydro-2-Phenanthrenecarboxylic Acid (Rings B/C Cis, Isomer 1)*

A. ESTER OF d-7-METHOXY-1,2,3,4,4a,9,10,10a-OCTAHYDRO-2-PHENANTHRENECARBOXYLIC ACID (RINGS B/C CIS, ISOMER 1) WITH l-MANDELIC ACID

To a solution of the dl-acid, prepared in Example 4, in 260 ml. of benzene is added 160 ml. of thionyl chloride and the resulting solution is heated under reflux for 1.5 hours. It is then cooled and concentrated to dryness under vacuum. The residue is evaporated twice in the presence of benzene to remove the last traces of thionyl chloride. To the resulting crude acid chloride in 90 ml. of anhydrous acetonitrile is added a solution of 28.0 g. of l-mandelic acid in 110 ml. of anhydrous acetonitrile and the solution is allowed to stand overnight at room temperature. The resulting precipitate is filtered and is crystallized once from acetonitrile and twice from ethanol (charcoal) to give 12.77 g. of the l-mandelic acid ester of the dextro acid as a colorless solid, M.P. 200–203°, $[\alpha]_D^{24}$ —54.3°±2° (c. 1.21 in dioxane). A further 1.83 g., M.P. 199–202°, $[\alpha]_D^{25}$ —52.8±2° (c. 1.19 in dioxane) is recovered from the mother liquors. Total yield: 14.60 g. (43%). Crystallization from ethanol gives a pure sample, M.P. 202–203.5°, $[\alpha]_D^{24}$ —53.9°±2° (c. 1.12 in dioxane).

B. d - 7 - METHOXY - 1,2,3,4,4a,9,10,10a - OCTAHYDRO-2-PHENANTHRENECARBOXYLIC ACID (RINGS B/C CIS, ISOMER 1)

A solution of 12.1 g. of the above ester (part "A") in 200 ml. of 5% ethanolic potassium hydroxide is heated under reflux for 2 hours in an atmosphere of nitrogen. The solution is then cooled and evaporated to dryness. The residue is diluted with 600 ml. of water and washed twice with ether. The aqueous layer is acidified to Congo red with 3 N hydrochloric acid. The resulting precipitate is crystallized once from acetonitrile and once from ethanol (charcoal) to give 6.10 g. (76.5%) of the dextro acid as a colorless solid, M.P. 243.5–246°, $[\alpha]_D^{23}$ +23.9°±2° (c. 1.18 in chloroform). One further crystallization from ethanol gives a pure sample, M.P. 243–245°, $[\alpha]_D^{23}$ +25.4°±2° (c. 1.21 in chloroform).

C. ESTER OF l-7-METHOXY-1,2,3,4,4a,9,10,10a-OCTAHYDRO-2-PHENANTHRENECARBOXYLIC ACID (RINGS B/C CIS, ISOMER 1) WITH d-MANDELIC ACID

The filtrates from the crystallization of the l-mandelic acid ester of the dextro acid (part "A") are combined and evaporated to dryness. Hydrolysis of the resulting residue with 5% alcoholic potassium hydroxide, as described above, gives 21.6 g. of crude solid. One crystallization from acetonitrile gives 16.19 g. of crude levo acid, M.P. 233–238°, $[\alpha]_D^{25}$ —18.8°±2° (c. 1.19 in chloroform). To a solution of 15.2 g. of the above crude levo acid in 88 ml. of benzene is added 53 ml. of thionyl chloride and the resulting mixture heated under reflux for 1.5 hours. It is then cooled and concentrated to dryness under vacuum. The residue is evaporated twice in the presence of benzene to remove the last traces of thionyl chloride. To the resulting crude acid chloride in 30 ml. of anhydrous acetonitrile is added a solution of 9.50 g. of d-mandelic acid in 38 ml. of acetonitrile and the solution is allowed to stand overnight at room temperature. The resulting precipitate is filtered and is crystallized once from acetonitrile to give 14.98 g. (44%) of the d-mandelic acid ester of the levo acid, M.P. 200–203°, $[\alpha]_D^{23}$ +54.2°±2° (c. 1.05 in dioxane). Crystallization from ethanol gives a pure sample, M.P. 202–203°, $[\alpha]_D^{24}$ +55.4° (c. 1.04 in dioxane).

D. l - 7 - METHOXY - 1,2,3,4,4a,9,10,10a - OCTAHYDRO-2-PHENANTHRENECARBOXYLIC ACID (RINGS B/C CIS, ISOMER 1)

A solution of 14.98 g. of the above ester (part "C") in 250 ml. of 5% ethanolic potassium hydroxide is heated under reflux for 2 hours in an atmosphere of nitrogen. The solution is then cooled and evaporated to dryness. The residue is diluted with 300 ml. of water and washed twice with ether. The aqueous phase is acidified to Congo red with 3 N hydrochloric acid. The resulting precipitate is crystallized once from acetonitrile and once from ethanol (charcoal) to give 7.09 g. (71.5%) of the levo acid as a colorless solid, M.P. 243–245.5°, $[\alpha]_D^{24}$ —24°±2° (c. 1.12 in chloroform). One further crystallization from ethanol gives a pure sample, M.P. 243–245°, $[\alpha]_D^{23}$ —23.9°±2° (c. 1.27 in chloroform).

*Preparation of dl - 7 - Methoxy - 1,2,3,4,4a,9,10,10a-Octahydro-2-Phenanthrenecarboxylic Acid (Rings B/C Cis, Isomer 2)*

A. BY HYPOBROMITE OXIDATION OF 2-ACETYL-7-METHOXY - 1,2,3,4,4a,9,10,10a - OCTAHYDROPHENANTHRENE (RINGS B/C CIS, ISOMER 2)

A solution of sodium hypobromite is prepared from 30.8 g. of sodium hydroxide and 47.6 g. (15.4 ml.) of bromine in 425 ml. of water. To this cooled solution (ice bath) is added with stirring 22.0 g. of dl-2-acetyl-7-methoxy - 1,2,3,4,4a,9,10,10a - octahydrophenanthrene (rings B/C cis, isomer 2), dissolved in 425 ml. of dioxane, at such a rate (about 20 minutes) that the temperature does not rise above 10°. When the addition is complete, the cooling bath is removed and the mixture is stirred at room temperature for 2 hours. It is then concentrated in vacuo to about one-third its original volume and then diluted with 1800 ml. of water. This solution is extracted twice with ether and then cooled and acidified to Congo red with 180 ml. of 3 N hydrochloric acid. The resulting precipitate is filtered, washed with water and dried to give 14.85 g. of yellow solid, M.P. 139–152°. Two crystallizations from acetonitrile gives 10.0 g. of crude products, M.P. 145–162°.

To 8.8 g. of this crude product in 90 ml. of glacial acetic acid is added 24 g. of zinc and the mixture heated under reflux for one hour. The resulting mixture is filtered, evaporated to dryness and the product isolated with 10% potassium hydroxide solution. This solution is acidified and the resulting precipitate is filtered and recrystallized from acetonitrile to give 6.16 g. (31%) of dl-7-methoxy-1,2,3,4,4a,9,10,10a-octahydro-2-phenanthrenecarboxylic acid (rings B/C cis, isomer 2) as a colorless solid, M.P. 161–164°. Crystallization from acetonitrile gives a pure sample, M.P. 162–164°.

B. BY CATALYTIC HYDROGENATION OF 7-METHOXY-1,2,3,4,9,10 - HEXAHYDRO - 2 - PHENANTHRENECARBOXYLIC ACID

To a suspension of 1400 g. of 7-methoxy-1,2,3,4,9,10-hexahydro-2-phenanthrenecarboxylic acid in 18 liters of ethyl acetate is added 155 g. of 10% palladium on carbon and the resulting mixture hydrogenated at room temperature and atmospheric pressure until the absorption of hydrogen ceases. The mixture is filtered and the catalyst well washed with methylene chloride. The filtrate is concentrated to dryness to give the crude product as a colorless solid, M.P. about 141–167°. The crude product is dissolved in 16 liters of hot ethanol and to this solution is added 600 ml. of morpholine in 2 liters of ethanol. The product which crystallizes on standing is filtered to give 1241 g. of the morpholine salt, M.P. 142–145°. (Concentration of the mother liquors gives a further 55.3 g. of product, M.P. 143–146°.) Total yield: 1306 g. (69.5%). Crystallization from ethanol gives a pure sample, M.P. 143–146°.

A solution of the above morpholine salt (1240 g.) in 12 liters of methylene chloride is washed twice with a total of 12 liters of 3 N hydrochloric acid and once with water. The organic layer is dried (anhydrous $Na_2SO_4$) and evaporated to dryness to give a solid which is crystallized from ethyl acetate to give 837 g. of dl-7-methoxy-1,2,3,4,4a,9,10,10a - octahydro-2-phenanthrenecarboxylic acid (rings B/C cis, isomer 2), M.P. 162.5–164.5°. Total yield: 885.4 g. (95% yield from the morpholine salt, and 66% overall yield from 7-methoxy-1,2,3,4,9,10-hexahydro-2-phenanthroic acid).

The mother liquors from the morpholine salt are concentrated to dryness and the residue dissolved in 8 liters of methylene chloride. The resulting solution is washed three times with a total of 3 liters of 3 N hydrochloric acid. The organic layers are washed with water, combined, dried (anhydrous $Na_2SO_4$) and evaporated to dryness. The resulting solid is crystallized twice from ethanol to give 156 g. of dl-7-methoxy-1,2,3,4,4a,9,10,10a-octahydro - 2 - phenanthrenecarboxylic acid (rings B/C cis, isomer 1), M.P. 221–223°.

*Resolution of dl - 7 - Methoxy-1,2,3,4,4a,9,10,10a-Octahydro-2-Phenanthrenecarboxylic Acid (Rings B/C Cis, Isomer 2)*

A. CINCHONIDINE SALT OF l-7-METHOXY-1,2,3,4,4a,9,10,10a - OCTAHYDRO-2-PHENANTHRENECARBOXYLIC ACID (RINGS B/C CIS, ISOMER 2)

To a solution of 40.0 g. of dl-7-methoxy-1,2,3,4,4a,9,10,10a - octahydro-2-phenanthrenecarboxylic acid (rings B/C cis, isomer 2) in 3 liters of boiling acetone is added 45.25 g. of cinchonidine and the solution is concentrated to about 2 liters. The product which crystallizes on standing is filtered to give 36.05 g. of colorless solid, M.P. 143–145°. Several further crystallizations from acetone gives 23.53 g. of the cinchonidine salt, M.P. 148.5–150.5°, $[\alpha]_D^{25}$ —77.9°±2° (c. 1.01 in ethanol). A further 3.28 g., M.P. 147–149°, $[\alpha]_D^{24}$ —79.8°±2° (c. 1.002 in ethanol), is recovered from the mother liquors. Total yield: 26.81 g. (63%). A pure sample crystallizes from acetone as a colorless solid, M.P. 148.5–150.5°, $[\alpha]_D^{24}$ —78.3°±2° (c. 1.01 in ethanol).

B. l-7-METHOXY-1,2,3,4,4a,9,10,10a-OCTAHYDRO-2-PHENANTHRENECARBOXYLIC ACID (RINGS B/C CIS, ISOMER 2)

A solution of the above cinchonidine salt (26 g.) in 900 ml. of methylene chloride is washed twice with 500 ml. of 2 N hydrochloric acid and once with water. The organic layer is dried (anhydrous $Na_2SO_4$), evaporated to dryness and the resulting solid crystallized from ethyl acetate to give 7.25 g. of colorless product, M.P. 157–158.5°, $[\alpha]_D^{24}$ —60.9°±2° (c. 1.01 in chloroform). A further 2.51 g., M.P. 156.5–158.5°, $[\alpha]_D^{25}$ —59.7°±2° (c. 1.02 in chloroform) is recovered from the mother liquors. Total yield of levo acid: 9.76 g. (81%). One crystallization from acetonitrile gives a pure sample, M.P. 156.5–158.5°, $[\alpha]_D^{24}$ —59.4°±2° (c. 1.01 in chloroform).

C. l-EPHEDRINE SALT OF d-7-METHOXY-1,2,3,4,4a,9,10,10a - OCTAHYDRO - 2 - PHENANTHRENECARBOXYLIC ACID (RINGS B/C CIS, ISOMER 2)

The filtrates from the crystallization of the cinchonidine salt of the levo acid (part "A") are combined and concentrated to dryness. Acidification of the resulting salt with 2 N hydrochloric acid, as described above, gives 16.5 g. of crude dextro acid, M.P. 150–153°, $[\alpha]_D^{24}$ +49.4° (c. 1.01 in chloroform). To a solution of 15.7 g. of the crude dextro acid in 300 ml. of hot ethyl acetate is added 11.17 g. of l-ephedrine. The product which crystallizes on standing is filtered to give 21.8 g. of colorless solid, M.P. 158.5–161.5°. Crystallization from ethyl acetate gives 19.83 g. (63.7%) of the l-ephedrine salt of the dextro acid, M.P. 159–162°, $[\alpha]_D^{23}$ +23.9°±2° (c. 1.00 in ethanol). One further crystallization from ethyl acetate gives a pure sample, M.P. 159.5–162.5°, $[\alpha]_D^{23}$ +22.7°±2° (c. 1.01 in ethanol).

D. d-7-METHOXY-1,2,3,4,4a,9,10,10a-OCTAHYDRO-2-PHENANTHRENECARBOXYLIC ACID (RINGS B/C CIS, ISOMER 2)

A solution of the above ephedrine salt (19.2 g.) in 500 ml. of methylene chloride is washed twice with 250 ml. of 2 N hydrochloric acid and once with water. The organic layers are dried (anhydrous $Na_2SO_4$), evaporated to dryness and the resulting solid crystallized from ethyl acetate to give 7.57 g. of colorless product, M.P. 157–158°, $[\alpha]_D^{24}$ +59.9°±2° (c. 1.01 in chloroform). A further 2.45 g., M.P. 155–157°, $[\alpha]_D^{23}$ +60.5°±2° (c. 1.01 in chloroform) is recovered from the mother liquors. Total yield of dextro acid: 10.02 g. (88%). Crystallization from acetonitrile gives a pure sample, M.P. 156.5–158°, $[\alpha]_D^{25}$ +60.6° (c. 1.01 in chloroform).

We claim:
1. A 2-substituted-7-methoxy-1,2,3,4,4a,9,10,10a-octahydrophenanthrene having the formula

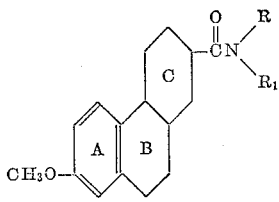

wherein R and $R_1$ can be the same or different and are selected from the group consisting of hydrogen, lower alkyl; the group —$CH_2CH_2Y$ wherein Y is selected from the group consisting of hydroxy and dilower alkylamino, and when taken together form with the nitrogen atom, a saturated 5 to 8 membered heterocyclic ring having the nitrogen atom as the only hetero atom present.

2. A compound according to claim 1 wherein R and $R_1$ are H.
3. A compound according to claim 1 wherein R is H and $R_1$ is methyl.
4. A compound according to claim 1 wherein R and $R_1$ are ethyl.
5. A compound according to claim 1 wherein R is H and $R_1$ is n-propyl.
6. A compound according to claim 1 wherein R and $R_1$ are methyl.
7. A compound according to claim 1 wherein R is H and $R_1$ is diethylaminoethyl.
8. A compound according to claim 1 wherein R and $R_1$ are β-hydroxyethyl.
9. A compound according to claim 1 wherein R and $R_1$, taken together with the nitrogen atom, are piperidino.
10. The isomer of 2-(N,N-dimethylcarbamyl)-7-methoxy - 1,2,3,4,4a,9,10,10a - octahydrophenanthrene (rings B/C cis) corresponding stereoisometrically to the higher melting isomer of 7-methoxy-1,2,3,4,4a,9,10,10a-octahydrophenanthrene (rings B/C cis)-2-carboxylic acid.
11. The isomer of 2-(N-diethylaminoethylcarbamyl)-7-methoxy - 1,2,3,4,4a,9,10,10a - octahydrophenanthrene (rings B/C cis) corresponding stereoisometrically to the higher melting isomer of 7-methoxy-1,2,3,4,4a,9,10,10a-octahydrophenanthrene (rings B/C cis)-2-carboxylic acid.

References Cited in the file of this patent
UNITED STATES PATENTS
2,788,363    Anner et al. _____ Apr. 9, 1957

OTHER REFERENCES
Buchi et al.: Helvetica Chimica Acta, vol. 34: pages 1006 and 1008 (1951).
Kratzl et al.: Monatshefte für Chemie, vol. 92 [No. 2]; page 386 (1961).
Kuehne: Jour. Am. Chem. Soc., vol. 83, pages 1492–1498 (March 1961).

UNITED STATES PATENT OFFICE
CERTIFICATE OF CORRECTION

Patent No. 3,123,611                                March 3, 1964

Moses Wolf Goldberg et al.

It is hereby certified that error appears in the above numbered patent requiring correction and that the said Letters Patent should read as corrected below.

Column 2, line 22, for "2-carbamyl" read -- 2-(carbamyl --; column 4, line 42, for "9,10,10-" read -- 9,10,10a- --; lines 46 and 47, for "Carbamyl-7-1,2", in italics, read -- Carbamyl-7-Methoxy-1,2 --, in italics; column 6, line 68, for "chroroform" read -- chloroform --; column 7, line 36, for "5.6 of" read -- 5.6 ml. of --.

Signed and sealed this 3rd day of November 1964.

(SEAL)
Attest:

ERNEST W. SWIDER
Attesting Officer

EDWARD J. BRENNER
Commissioner of Patents